US009929597B2

(12) United States Patent
Jaskolski et al.

(10) Patent No.: US 9,929,597 B2
(45) Date of Patent: Mar. 27, 2018

(54) METHOD AND APPARATUS FOR POWER TRANSFER THROUGH HIGH PERMEABILITY MATERIALS

(71) Applicant: FMC Technologies, Inc., Houston, TX (US)

(72) Inventors: Corey Jaskolski, Severance, CO (US); John J. Mulholland, Dunfermline (GB)

(73) Assignee: FMC Technologies, Inc., Houston, TX (US)

( * ) Notice: Subject to any disclaimer, the term of this patent is extended or adjusted under 35 U.S.C. 154(b) by 274 days.

(21) Appl. No.: 14/767,840

(22) PCT Filed: Feb. 26, 2013

(86) PCT No.: PCT/US2013/027735
§ 371 (c)(1),
(2) Date: Aug. 13, 2015

(87) PCT Pub. No.: WO2014/133480
PCT Pub. Date: Sep. 4, 2014

(65) Prior Publication Data
US 2015/0372501 A1    Dec. 24, 2015

(51) Int. Cl.
*H02J 5/00* (2016.01)
*H02J 50/10* (2016.01)
(Continued)

(52) U.S. Cl.
CPC ............. *H02J 50/10* (2016.02); *H01F 38/14* (2013.01); *H02J 5/005* (2013.01); *H02J 50/90* (2016.02); *H01F 2038/143* (2013.01)

(58) Field of Classification Search
None
See application file for complete search history.

(56) References Cited

U.S. PATENT DOCUMENTS 7,498,681 B1 *   3/2009   Kellogg ................. H02K 35/02
                                                             290/1 R
8,364,079 B2     1/2013   Rhodes et al.
(Continued)

FOREIGN PATENT DOCUMENTS

| EP | 2 541 564 A1 | 1/2013 |
|---|---|---|
| WO | WO 01/78216 A1 | 10/2001 |
| WO | WO 2011/126466 A1 | 10/2011 |

*Primary Examiner* — Jared Fureman
*Assistant Examiner* — Aqeel Bukhari
(74) *Attorney, Agent, or Firm* — Henry C. Query, Jr.

(57) ABSTRACT

A magnetic saturation apparatus for a wireless inductive power and/or data transfer system which comprises a magnetic field transmitter positioned on a first side of a barrier and a magnetic field receiver positioned on a second side of the barrier. The magnetic saturation apparatus includes a saturation magnet which is positioned on one side of the barrier and which in use generates a saturation flux in an adjacent saturation region of the barrier which is located at least partially between the transmitter and the receiver. The saturation flux effectively lowers the magnetic permeability of the saturation region and thereby inhibits the magnetic flux generated by the transmitter from shorting through the barrier and back into the transmitter. Thus, the saturation region facilitates the flow of magnetic flux from the transmitter into the receiver.

23 Claims, 9 Drawing Sheets

(51) Int. Cl.
*H02J 50/90* (2016.01)
*H01F 38/14* (2006.01)

(56) References Cited

U.S. PATENT DOCUMENTS

| | | |
|---|---|---|
| 2001/0038287 A1 | 11/2001 | Amini |
| 2008/0070499 A1 | 3/2008 | Wilhelm et al. |
| 2009/0156119 A1 | 6/2009 | Rhodes et al. |
| 2014/0265613 A1 | 9/2014 | Jaskolski et al. |
| 2014/0339914 A1* | 11/2014 | Pooley .................. H02J 50/10 307/104 |
| 2015/0251546 A1* | 9/2015 | Oyobe .................. B60L 5/005 307/10.1 |

\* cited by examiner

METHOD AND APPARATUS FOR POWER TRANSFER THROUGH HIGH PERMEABILITY MATERIALS

BACKGROUND OF THE INVENTION

The present invention relates to a system which uses magnetic induction to wirelessly transmit power and/or data through a barrier. More particularly, the invention relates to a method and apparatus for magnetically saturating the barrier to increase the power transfer efficiency of such a system.

Systems which use magnetic induction to wirelessly transmit power and data signals through barriers are known in the art. Referring to FIG. 1, such inductive power and data transfer systems commonly include a magnetic field transmitter 10 which is positioned on one side of a barrier 12 and a magnetic field receiver 14 which is positioned on the opposite side of the barrier. The magnetic field transmitter 10 typically includes a transmitter coil 16 which is wound around a transmitter core 18 and the magnetic field receiver 14 usually includes a receiver coil 20 which is wound around a receiver core 22. The transmitter 10 is connected to a signal generator 24 which when activated generates a time varying current that flows through the transmitter coil 16. The flow of current through the transmitter coil 16 causes the transmitter core 18 to generate a time varying magnetic field which in theory flows through the barrier 12 to the receiver 14. At the receiver 14, the time varying magnetic field flows through the receiver core 22 and causes a current to flow through the receiver coil 20 which may then be used to power a device 26 that is connected to the receiver coil.

Although inductive data transfer systems work reasonably well with barriers made of many types of materials, inductive power transfer systems usually work satisfactorily only with barriers made of materials having relatively low magnetic permeabilities. The reason for this can be explained by reference to FIGS. 2 and 3, which are representations of the inductive power transfer system of FIG. 1 showing the paths that the magnetic field lines follow when the barrier 12 is made of a material having a relative magnetic permeability of around 10 and a material having a relative magnetic permeability of around 100, respectively. As shown in FIG. 2, when the barrier 12 is made of a material having a relative magnetic permeability of around 10, a substantial portion of the magnetic field lines generated by the transmitter 10 flow through the barrier and into the receiver core 22. In contrast, as shown in FIG. 3, when the barrier 12 is made of a material having a magnetic permeability of around 100, relatively few of the magnetic field lines flow through the barrier and into the receiver core 22. Instead, most of the magnetic field lines generated by the transmitter 10 "short" through the barrier 12 and return to the transmitter core 18 before reaching the receiver core 22.

The power transfer efficiency of an inductive power transfer system is directly proportional to the amount of magnetic flux generated by the transmitter which flows through the receiver core. The magnetic flux through the receiver core in turn is proportional to the number of magnetic field lines which pass through the transverse cross section of the receiver core. Comparing FIG. 2 with FIG. 3, therefore, one can see that the amount of magnetic flux in the receiver core 22 when the barrier 12 has a relative magnetic permeability of 10 is significantly greater than the amount of magnetic flux in the receiver core 22 when the barrier 12 has a relative magnetic permeability of 100. Therefore, the power transfer efficiency of the inductive power transfer system will be relatively high when the barrier 12 is made of a material having a relatively low magnetic permeability.

However, in many applications in which inductive power transfer systems would be beneficial, the barriers are made from materials having relatively high magnetic permeabilities. For example, in the subsea oil and gas production industry, electrically powered devices such as sensors, transmitters and actuators are sometimes positioned inside the production equipment components, such as wellhead housings, christmas tree flow lines and valve actuators, in order to monitor and control the flow of fluids through the components. Although power for these electrically powered devices may be provided by internal batteries or external power supplies, batteries lose charge over time and external power supplies require the drilling of holes through the components to accommodate pass-through connectors, and such holes are undesirable when the pressure integrity of the components must be assured.

Therefore, an inductive power transfer system for powering devices positioned inside subsea oil and gas production equipment components would be beneficial. However, many of the common materials used to manufacture these components, such as 4130, X65, Super Duplex and 1010 steel, have relative permeabilities near 1000. Consequently, the power transfer efficiencies for an inductive power transfer system for use with these components would likely be only a small fraction of a percent. As a result, inductive power transfer systems are not practical for use with such components.

SUMMARY OF THE INVENTION

In accordance with the present invention, these and other limitations in the prior art are addressed by providing a magnetic saturation apparatus for a wireless inductive power and/or data transfer system which comprises a magnetic field transmitter that is positioned on a first side of a barrier and a magnetic field receiver that is positioned on a second side of the barrier opposite the first side, the transmitter generating a magnetic flux which is intended to be coupled across the barrier and into the receiver. The magnetic saturation apparatus in accordance with one embodiment of the invention comprises at least a first saturation magnet which is positioned on one of the first and second sides of the barrier and which in use generates a saturation flux in an adjacent saturation region of the barrier, the saturation region being located at least partially between the transmitter and the receiver. The saturation flux effectively lowers the magnetic permeability of the saturation region and thereby inhibits the magnetic flux generated by the transmitter from shorting through the barrier and back into the transmitter. In this manner, the saturation region facilitates the flow of magnetic flux from the transmitter into the receiver.

In accordance with another embodiment of the invention, the transmitter comprises two poles and the first saturation magnet includes at least a first portion which is positioned between the poles. The first saturation magnet may also include a second portion which is positioned around both of the poles.

In accordance with yet another embodiment of the invention, the transmitter comprises two poles and the first saturation magnet is positioned around one of the poles. The saturation apparatus may optionally include a second saturation magnet which is positioned around the other of the poles.

In accordance with a further embodiment of the invention, the saturation apparatus includes a second saturation magnet which is positioned on a side of the barrier opposite the first saturation magnet and the saturation region is located between the first and second saturation magnets. In this embodiment, the transmitter may comprise two transmitter poles, the receiver may comprise two receiver poles, each of which is positioned opposite a corresponding transmitter pole, the first saturation magnet may include at least a first portion which is positioned between the transmitter poles, and the second saturation magnet may include at least a first portion which is positioned between the receiver poles. The first saturation magnet may further include a second portion which is positioned around both of the transmitter poles, and the second saturation magnet may further include a second portion which is positioned around both of the receiver poles.

In accordance with still another embodiment of the invention, the transmitter comprises first and second transmitter poles, the receiver comprises first and second receiver poles, each of which is positioned opposite a corresponding one of the transmitter poles, the first saturation magnet is positioned around the first transmitter pole, and the second saturation magnet is positioned around the receiver pole which is located opposite the first transmitter pole. In this embodiment the saturation apparatus may further comprise a third saturation magnet which is positioned around the second transmitter pole and a fourth saturation magnet which is positioned around the receiver pole located opposite the second transmitter pole.

In accordance with a further embodiment of the invention, the transmitter includes two poles and the first saturation magnet includes an elongated member which is positioned between the poles. In this embodiment, the barrier may comprise a tubular member and the first saturation magnet may be configured to conform to the shape of the tubular member. For example, the first saturation magnet may comprise a diameter which corresponds to a diameter of the tubular member.

In accordance with still another embodiment of the invention, the first saturation magnet comprises first and second longitudinally extending saturation poles and the saturation flux flows from the first saturation pole, through the barrier and into the second saturation pole.

In accordance with a further embodiment of the invention, the transmitter includes two transmitter poles and the first saturation magnet includes a generally circular first ring portion, a generally straight first rail portion which bisects the first ring portion, and two generally semi-circular first apertures which are defined by the first ring and first rail portions. In this embodiment, each transmitter pole is positioned in a corresponding first aperture.

In this embodiment, the receiver may also include two receiver poles, each of which is positioned generally opposite a corresponding transmitter pole. In that case, the saturation apparatus may further comprise a second saturation magnet which is positioned on a side of the barrier opposite the first saturation magnet and which includes a generally circular second ring portion, a generally straight second rail portion which bisects the second ring portion, and two generally semi-circular second apertures which are defined by the second ring and second rail portions. In this embodiment, each receiver pole is positioned in a corresponding first aperture.

In accordance with another embodiment of the invention, the transmitter includes first and second transmitter poles and the first saturation magnet comprises a ring-shaped configuration and is positioned around the first transmitter pole. In this embodiment, the receiver may also include two receiver poles, each of which is positioned generally opposite a corresponding transmitter pole. In that case, the saturation apparatus may further comprise a ring-shaped second saturation magnet which is positioned around the receiver pole located opposite the first transmitter pole. Furthermore, the saturation apparatus may optionally comprise a ring-shaped third saturation magnet which is positioned around the second transmitter pole, and a ring-shaped fourth saturation magnet which is positioned around the receiver pole located opposite the second transmitter pole.

The present invention also provides a method for facilitating the flow of magnetic flux from a magnetic field transmitter to a magnetic field receiver, the transmitter and receiver being located on opposite sides of a barrier. The method comprises the step of reducing the magnetic permeability of a region of the barrier which is located at least partially between the transmitter and the receiver. The region of reduced magnetic permeability inhibits the magnetic flux generated by the transmitter from shorting through the barrier and back into the transmitter. In this manner, the region of reduced magnetic permeability facilitates the flow of magnetic flux from the transmitter into the receiver.

In accordance with another embodiment of the invention, the transmitter comprises two poles and the region of reduced magnetic permeability comprises a first portion which is located at least partially between the two poles. The region of reduced magnetic permeability may further comprise a second portion which is located around both poles.

In accordance with a further embodiment of the invention, the transmitter comprises two poles and the region of reduced magnetic permeability comprises a first portion which is located around one of the poles. In this embodiment, the region of reduced magnetic permeability may also comprise a second portion which is located around the other of the poles.

Thus, the present invention provides an effective apparatus and method for improving the flow of magnetic flux through a barrier which is made of a relatively high magnetic permeability material. The invention in effect lowers the magnetic permeability of a portion of the barrier which is located between the poles of the transmitter. This in turn inhibits the flux generated by the transmitter from shorting through the barrier back to the transmitter. As a result, more of the flux is coupled into the receiver. Consequently, the power transfer efficiency of the inductive power/data transfer system is improved.

These and other objects and advantages of the present invention will be made apparent from the following detailed description, with reference to the accompanying drawings. In the drawings, the same reference numbers may be used to denote similar components in the various embodiments.

DETAILED DESCRIPTION OF THE INVENTION

Figure 1:
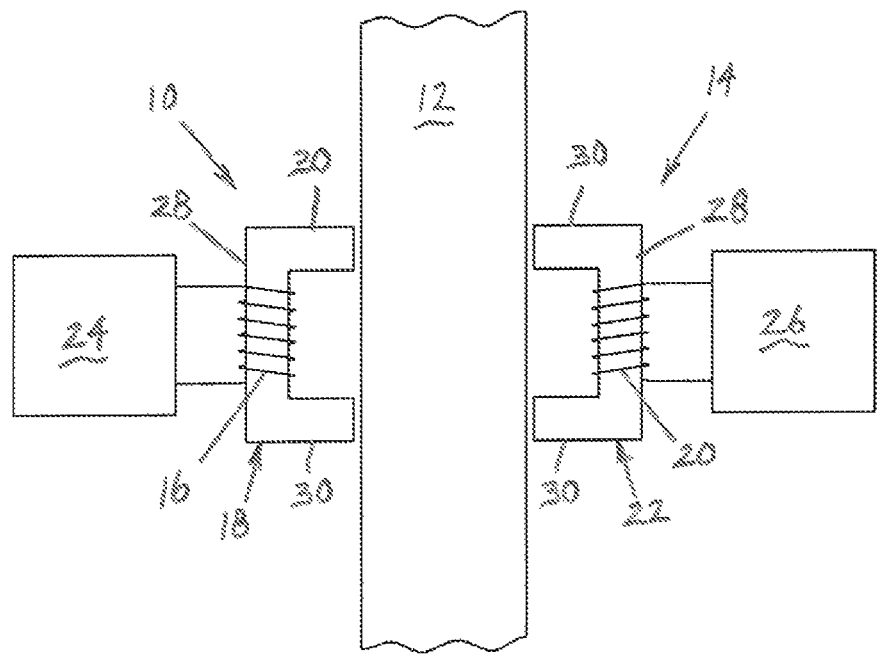
FIG. 1 is a schematic representation of an illustrative prior art wireless inductive power and/or data transfer system shown positioned across a exemplary barrier.

The present invention provides an effective method and apparatus for increasing the power and data transfer efficiencies of inductive power and/or data transfer systems to thereby enable such systems to be used with barriers that are made of relatively high magnetic permeability materials. Thus, the invention offers the opportunity to employ inductive power transfer systems to power devices which are contained within components that are commonly made of high magnetic permeability materials, such as subsea production equipment components, ship and submarine hulls, nuclear reactors and pressure vessels. For illustrative purposes only, the invention will be described herein in the context of a generic barrier which is made of flat plate 1010 steel having a relatively small thickness, such as one inch.

Also, for purposes of simplicity the several embodiments of the invention set forth below will be described in the context of the wireless inductive power and/or data transfer system shown in FIG. 1. In this illustrative and nonlimiting embodiment of an inductive power/data transfer system, the transmitter and receiver cores 18, 22 are each shown to comprise a generally C-shaped configuration which is defined by a main portion 28 around which the coil 16, 20 is wound and two leg portions 30 which extend transversely from opposite ends of the main portion. In this example, the leg portions 30 of the transmitter core 18 define the poles of the transmitter 10 and the leg portions of the receiver core 22 define the poles of the receiver 14. However, it should be understood that the present invention may be used with other types of magnetic field transmitters and receivers having different transmitter and receiver cores.

Figure 2:
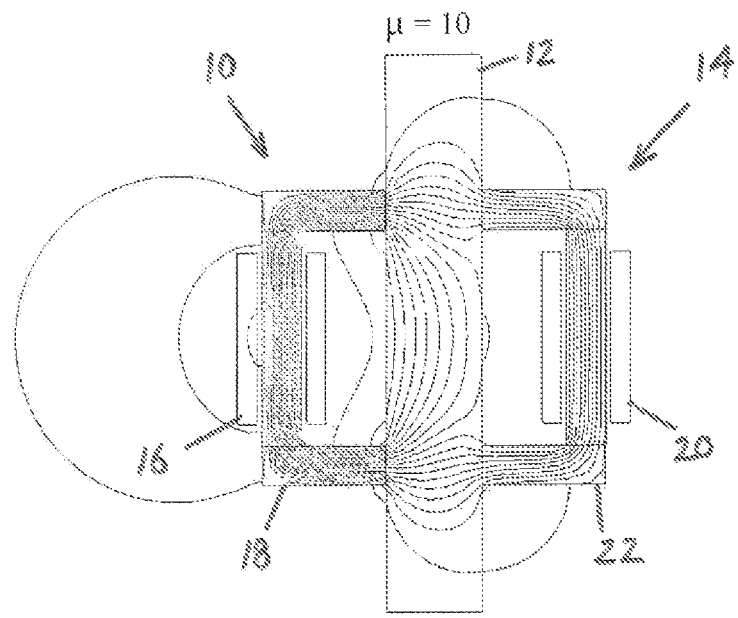
FIG. 2 is a representation of the inductive power/data transfer system of FIG. 1 showing the flow of magnetic flux through a barrier made of a material comprising a relative magnetic permeability of 10.
Figure 3:
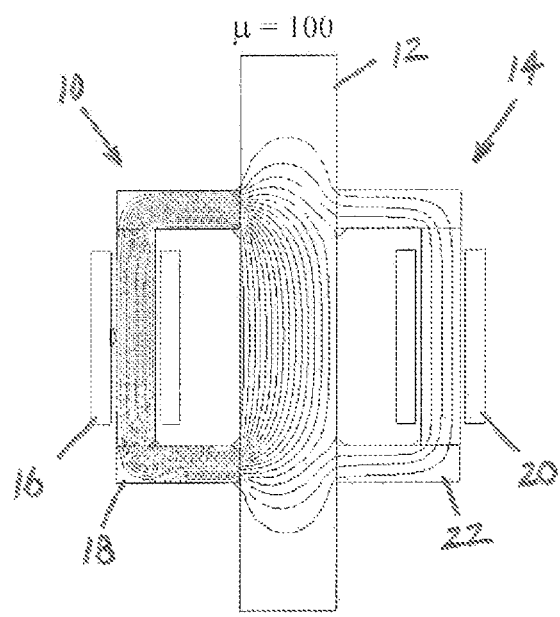
FIG. 3 is a representation of the inductive power/data transfer system of FIG. 1 showing the flow of magnetic flux through a barrier made of a material comprising a relative magnetic permeability of 100.

As discussed above in connection with FIGS. 2 and 3, the power transfer efficiency for the representative inductive power transfer system of FIG. 1 is higher for a barrier which is made of a relatively low magnetic permeability material as compared to a barrier which is made of a relatively high magnetic permeability material. This is due to the fact that, with the relatively high magnetic permeability material, the magnetic flux generated by the transmitter tends to short through the barrier and return to the transmitter core before it can reach the receiver core. As a result, very little of the magnetic flux generated by the transmitter is coupled into the receiver core.

In accordance with the present invention, the principle of magnetic saturation is employed to increase the power transfer efficiency of an inductive power transfer system by magnetically saturating a portion of the barrier to thereby inhibit the magnetic flux from shorting back into the transmitter core. As a result, more magnetic flux will flow through the barrier and into the receiver core. Consequently, the power transfer efficiency of the inductive power transfer system will be greatly increased.

Figure 4:
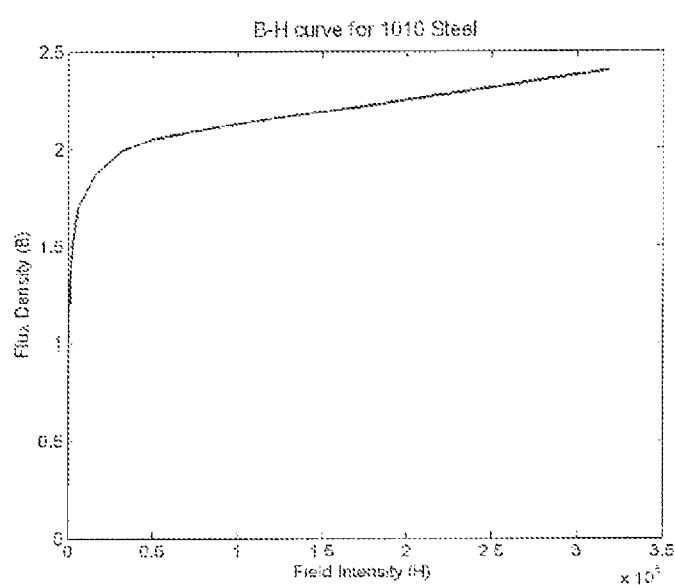
FIG. 4 is a graph of flux density (B) versus field intensity (H) for 1010 steel.

The theory behind magnetic saturation is that, in the presence of a magnetic field, high permeability materials will reach a saturation point where, even with increasing magnetic field intensity, the magnetic flux density will not increase without bounds. This effect can be seen in FIG. 4, which is a normal magnetization curve, or B-H curve, for 1010 steel. As shown in FIG. 4, when the magnetic field intensity (H) reaches about $0.5 \times 10^5$, the magnetic flux density (B) begins to level off and thereafter increases only slightly with increasing field intensity. The value of the magnetic flux density at this point is sometimes referred to as the saturation flux density. The asymptotic behavior of the curve following the saturation flux density point is due to the limited ability of the material's magnetic domains to continue to respond to additional field strength after a certain threshold is reached.

The relationship between magnetic field intensity (H) and magnetic flux density (B) is given by the equation $B=\mu H$. In this equation, $\mu$ is the magnetic permeability of the material and can be thought of as a scaling factor which determines how much flux is produced for a given field intensity. For many materials, including many of the common materials used in subsea production equipment components, magnetic permeability is not a fixed value but rather changes non-linearly with increasing field intensity. This effect is evidenced by the material's B-H curve.

Figure 5:
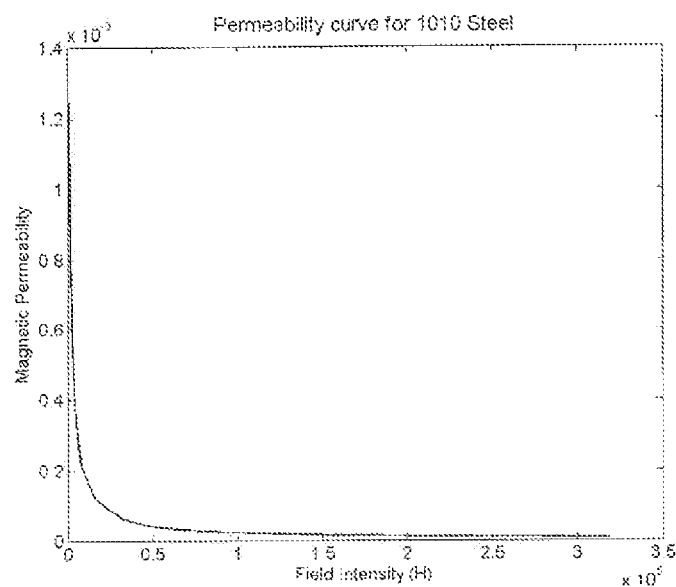
FIG. 5 is a graph of magnetic permeability versus field intensity (H) for 1010 steel.
Figure 6:
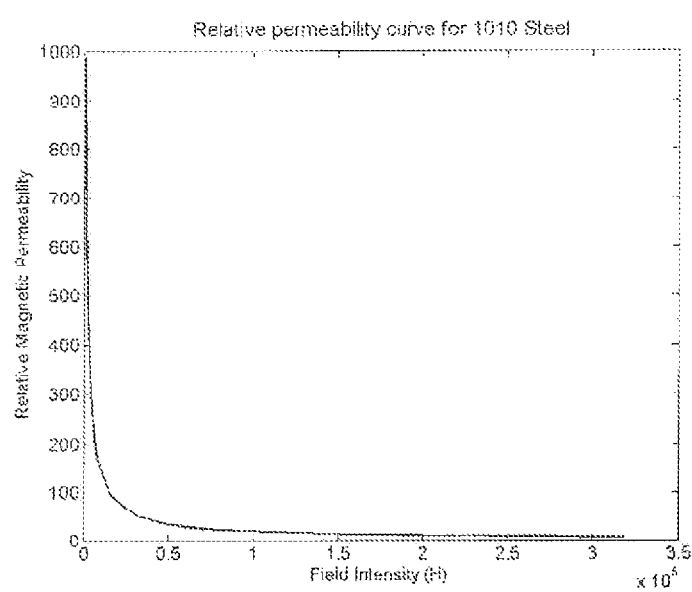
FIG. 6 is a graph of relative magnetic permeability versus field intensity (H) for 1010 steel.

The magnetic permeability of a material can be calculated from the material's B-H curve using the equation $\mu=B/H$, and these results can be plotted against the magnetic field intensity. The resulting plot of magnetic permeability versus magnetic field intensity for 1010 steel is shown in FIG. 5. As can been seen from FIG. 5, as the field intensity increases, the effective magnetic permeability of the material decreases. Scaling this magnetic permeability by dividing it by the constant $\mu_0$, which is the magnetic permeability of free space (defined as $\mu_0 = 4\pi \times 10^{-7}$), yields a plot of the material's relative magnetic permeability versus field intensity, which is shown for 1010 steel in FIG. 6.

From the above discussion it should be apparent that, as the intensity of the magnetic field increases to the point where the magnetic flux density is at or near the saturation flux density of the material, the magnetic permeability of the material will drop to a level at which little additional flux is able to flow through the material. Thus, by magnetically saturating a portion of a relatively high magnetic permeability barrier, a region of relatively low magnetic permeability will be created through which little additional magnetic flux can flow. By manipulating the size and shape of the saturated region or regions of the barrier, the magnetic flux generated by the transmitter in an inductive power/data transfer system can effectively be guided into the receiver core and inhibited from shorting through the barrier and back into the transmitter core. As a result, more of the magnetic flux will be coupled into the receiver core and the power transfer efficiency of the system will therefore be increased.

In accordance with the present invention, one or more magnets are used to magnetically saturate one or more portions of the barrier to thereby create corresponding regions of relatively low magnetic permeability which will effectively inhibit the magnetic flux generated by the transmitter from shorting through the barrier and back into the transmitter core.

Figure 7:
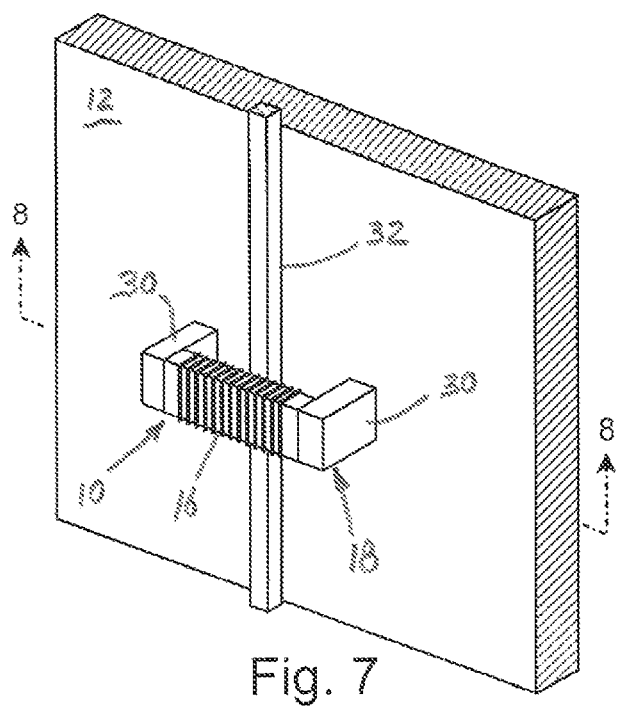
FIG. 7 is a perspective view of the inductive power/data transfer system of FIG. 1 including a first embodiment of the magnetic saturation apparatus of the present invention.
Figure 8:
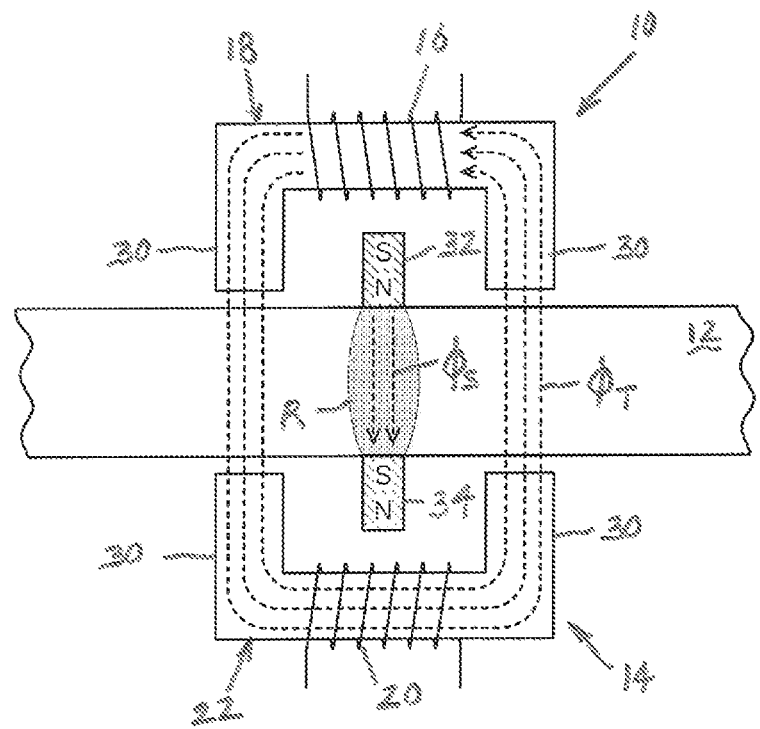
FIG. 8 is a cross sectional representation of the inductive power/data transfer system of FIG. 7 taken along line 8-8.

One embodiment of the magnetic saturation apparatus of the present invention is shown in FIGS. 7 and 8. The magnetic saturation apparatus of this embodiment comprises a pair of first and second saturation magnets 32, 34 which in use are positioned on opposite sides of the barrier 12 in alignment with one another. In this particular embodiment of the invention, the magnets 32, 34 are elongated members having a generally rectangular cross section and a length which is sufficient to prevent the magnetic flux generated by the transmitter 10 from shorting through the barrier 12 around the ends of the magnets. In addition, although depicted in FIG. 7 as being straight, the magnets 32, 34 may be bent or otherwise configured to conform to the shape of the barrier 12. For example, in the event the barrier is a tubular member, such as a pipe, one of both of the magnets 32, 34 may comprise a curved or ring-shaped configuration which comprises a diameter that corresponds to the diameter of the tubular member.

In the embodiment of the invention shown in the drawings, the magnets 32, 34 comprise permanent magnets which are made of a material that, for a given size and shape of the magnets, will generate a magnetic field of sufficient intensity to magnetically saturate a desired region of the barrier 12. Also, the magnets 32, 34 are ideally dipole magnets which are positioned as shown in FIG. 8 with opposite poles facing each other. In an alternative embodiment of the invention, the magnet which is mounted on the same side of the barrier 12 as the transmitter 10, such as the first magnet 32 in FIGS. 7 and 8, may comprise an electromagnet.

In this exemplary embodiment of the invention, the first magnet 32 is positioned approximately halfway between the leg portions 30 of the transmitter core 18 generally perpendicular to the transmitter coil 16, and the second magnet 34 is positioned approximately halfway between the leg portions 30 of the receiver core 22 generally perpendicular to the receiver coil 20. The magnets 32, 34 may be mounted to or supported adjacent the barrier 12 by any suitable means. For example, the magnet 32 may be positioned in a housing (not shown) for the transmitter 10 and the magnet 34 may be positioned in a housing (not shown) for the receiver 14, and these housing may be mounted to or supported adjacent the barrier 12 by appropriate means. Alternatively, the magnets 32, 34 may be mounted directly to the barrier 12 separately from the transmitter 10 and the receiver 14. In a further alternative, one of the magnets, such as the first magnet 32, may be positioned in a housing for the transmitter 10 or the receiver 14, as the case may be, and the other magnet, in this case the second magnet 34, may be mounted to the barrier separately from the transmitter or the receiver.

Figure 9:
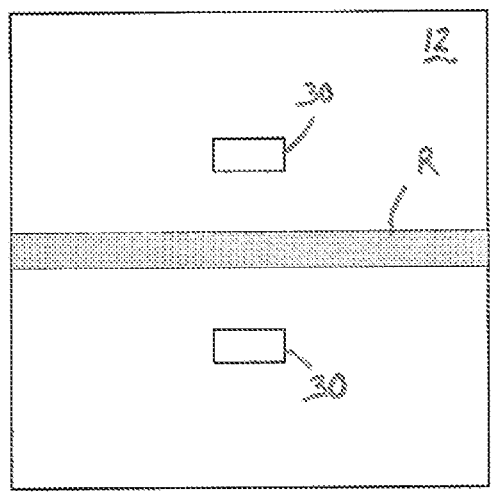
FIG. 9 is a highly idealized representation of the saturation region which is generated in the barrier by the saturation apparatus of FIG. 7.

The operation of the magnetic saturation apparatus of this embodiment of the invention will be described with reference to FIGS. 8 and 9. In operation, the first and second magnets 32, 34 generate a magnetic flux $\varphi_S$ (hereafter referred to as the saturation flux), which flows transversely through the barrier 12 between the magnets. The saturation flux $\varphi_S$ in effect reduces the magnetic permeability of a generally rectangular region R of the barrier (hereafter referred to as the saturation region) which is located both between the magnets 32, 34 and, due to the placement of the transmitter 10 relative to the magnets, between the leg portions 30 of the transmitter core 18. As a result, the flux $\varphi_T$ generated by the transmitter 10, which naturally seeks the path of least reluctance through the barrier 12, will be inhibited from flowing through the barrier 12 from one leg portion 30 of the transmitter core 18 to the other and instead will be guided transversely through the barrier and into the receiver core 22.

Figure 10:
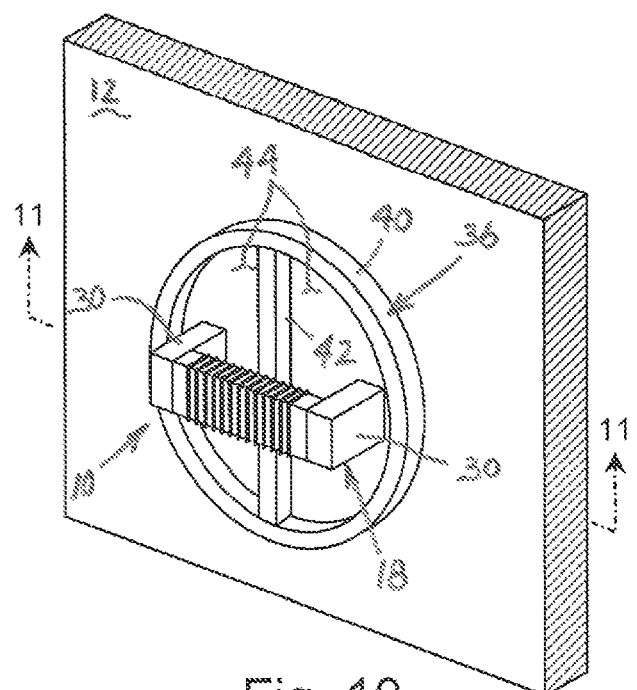
FIG. 10 is a perspective view of the inductive power/data transfer system of FIG. 1 including a second embodiment of the magnetic saturation apparatus of the present invention.
Figure 11:
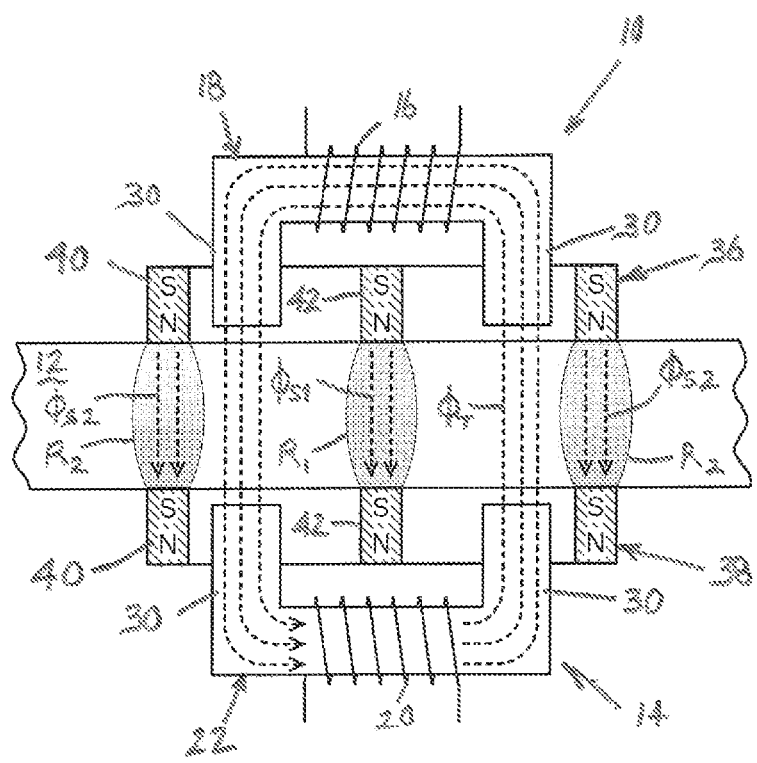
FIG. 11 is a cross sectional representation of the inductive power/data transfer system of FIG. 10 taken along line 11-11.

A second embodiment of the magnetic saturation apparatus of the present invention is shown in FIGS. 10 and 11. Similar to the saturation apparatus discussed above, the saturation apparatus of this embodiment of the invention comprises first and second saturation magnets 36, 38 which in use are positioned on opposite sides of the barrier 12. As shown best in FIG. 10, each magnet 36, 38 comprises a generally "phi"-shaped configuration which includes a ring portion 40 that is bisected by a rail portion 42 to thereby define two semi-circular apertures 44. The magnets 36, 38 may comprise permanent magnets which are positioned as shown in FIG. 11 with opposite poles facing each other. Alternatively, the first magnet 34 may comprise an electromagnet.

The magnets 36, 38 are oriented relative to each other such that the central axes of the ring portions 40 are generally co-linear and the longitudinal axes of the rail portions 42 are generally aligned. In addition, the transmitter core 18 is positioned relative to the first magnet 36 such that the transmitter coil 16 is generally perpendicular to the rail portion 42 and each leg portion 30 is received in a corresponding aperture 44. Similarly, the receiver core 22 is positioned relative to the second magnet 38 such that the receiver coil 20 is generally perpendicular to the rail portion 42 and each leg portion 30 is received in a corresponding aperture 44. As with the magnets 32, 34 discussed above, the magnets 36, 38 may be mounted to or supported adjacent the barrier 12 by any suitable means.

Figure 12:
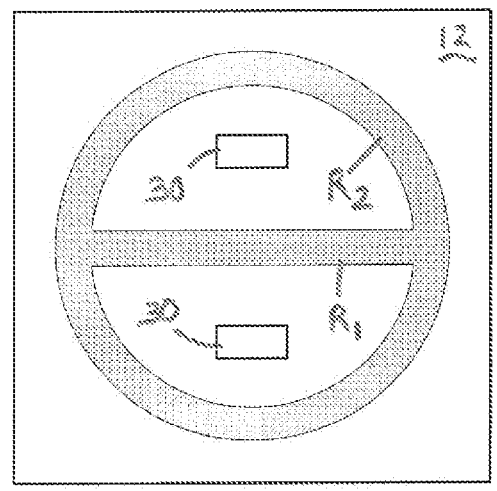
FIG. 12 is a highly idealized representation of the saturation region which is generated in the barrier by the saturation apparatus of FIG. 10.

In operation of the saturation apparatus of this embodiment of the invention, the first and second magnets 36, 38 generate a saturation flux in the barrier 12 which as shown in FIGS. 11 and 12 can be considered to comprise two components: a first flux component $\varphi_{S1}$ which flows transversely through the barrier between the rail portions 42 of the magnets and a second flux component $\varphi_{S2}$ which flows transversely through the barrier between the ring portions 40 of the magnets. The first flux component $\varphi_{S1}$ effectively reduces the magnetic permeability of a generally rectangular first saturation region $R_1$ of the barrier 12 located between the leg portions 30 of the transmitter core 18. As a result, the flux $\varphi_T$ generated by the transmitter 10 will be inhibited from flowing through the barrier 12 directly from one leg portion 30 of the transmitter core 18 to the other. In a similar manner, the second flux component $\varphi_{S2}$ effectively reduces the magnetic permeability of a generally circular second saturation region $R_2$ of the barrier 12 surrounding both leg portions 30 of the transmitter core 18. As a result, the flux $\varphi_T$ generated by the transmitter 10 will be inhibited from flowing through the barrier 12 from one leg portion 30 of the transmitter core 18 to the other around the ends of the first region $R_1$. Thus, the first and second saturation regions $R_1$, $R_2$ will guide the flux $\varphi_T$ transversely through the barrier 12 and into the receiver core 22.

Figure 13:
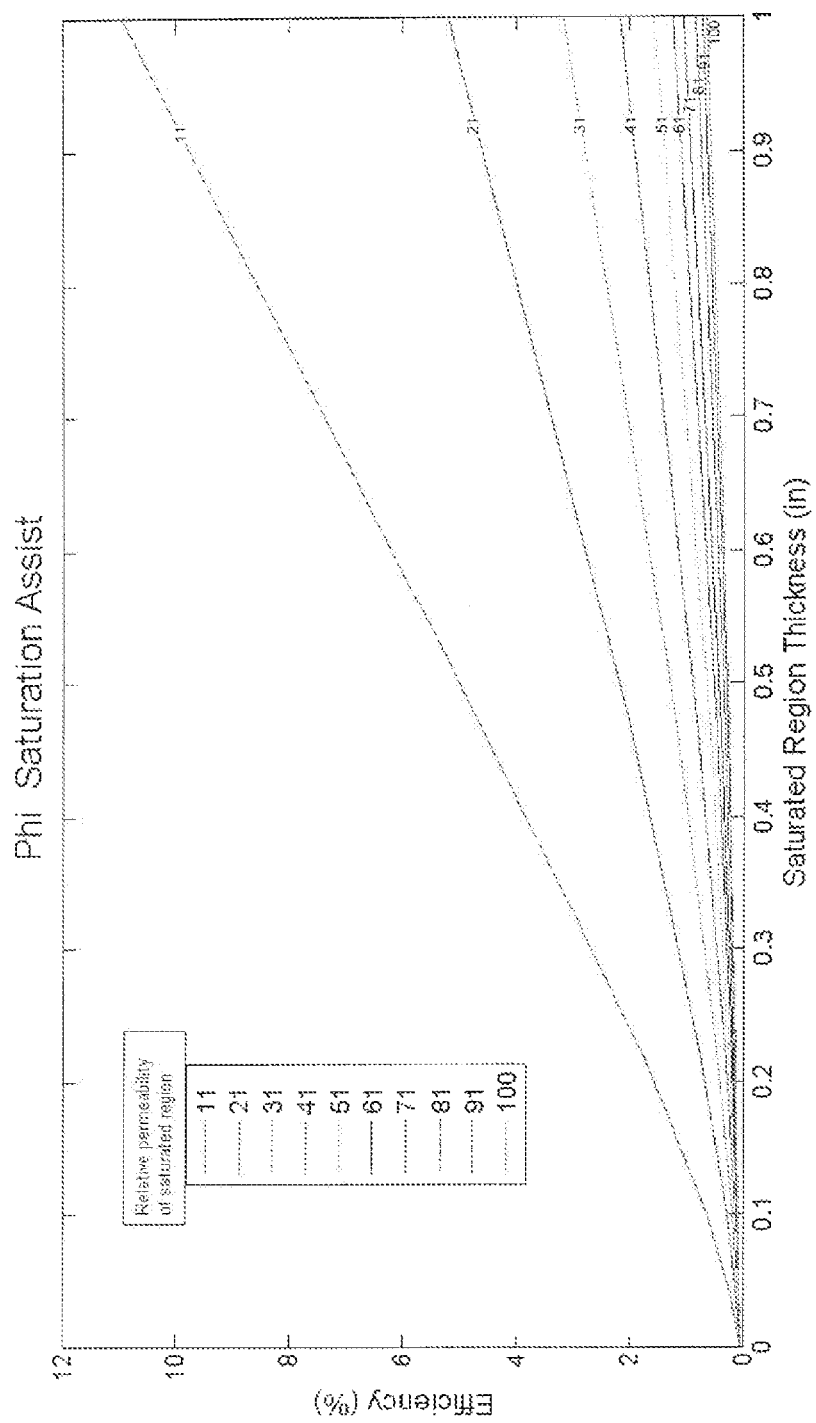
FIG. 13 is a graph of power transfer efficiency versus thickness of saturation region for a range of relative permeability values which was obtained from a computer simulation of an inductive power/data transfer system similar to that shown of FIG. 10.

FIG. 13 is a graph of the results of an FEA magnetic simulation which was modeled on an inductive power transfer system that was modified to include the magnetic saturation apparatus described immediately above. For this simulation, the barrier was defined as a one inch thick slab of steel having a relative magnetic permeability of 1000. The graph of FIG. 13 shows the power transfer efficiency of the system as a function of saturation region thickness for several values of relative magnetic permeability. As can be seen from this graph, when the saturated region comprises a relative magnetic permeability of 11, the power transfer efficiency exceeds 10% at a saturation depth approaching one inch. This represents a 250 times increase in power transfer efficiency over the analysis results obtained for an FEA magnetic simulation which was modeled on an inductive power transfer system that did not include the magnetic saturation apparatus of the present invention.

Figure 14:
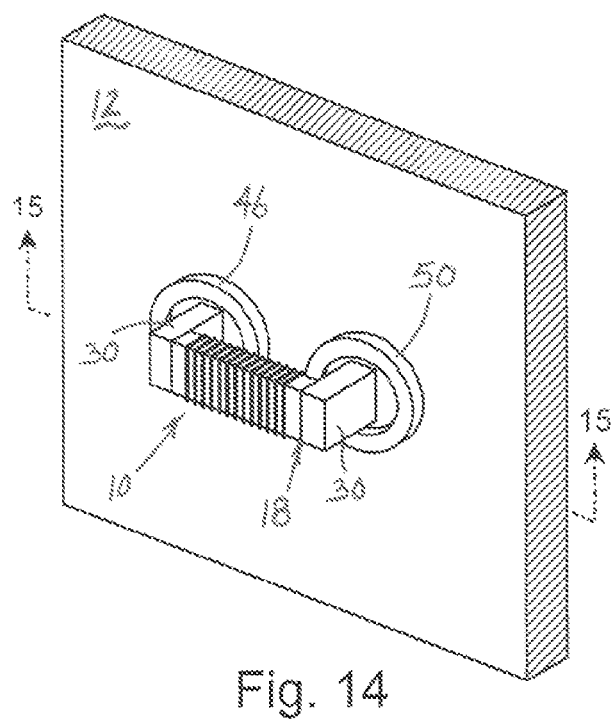
FIG. 14 is a perspective view of the inductive power/data transfer system of FIG. 1 including a third embodiment of the magnetic saturation apparatus of the present invention.
Figure 15:
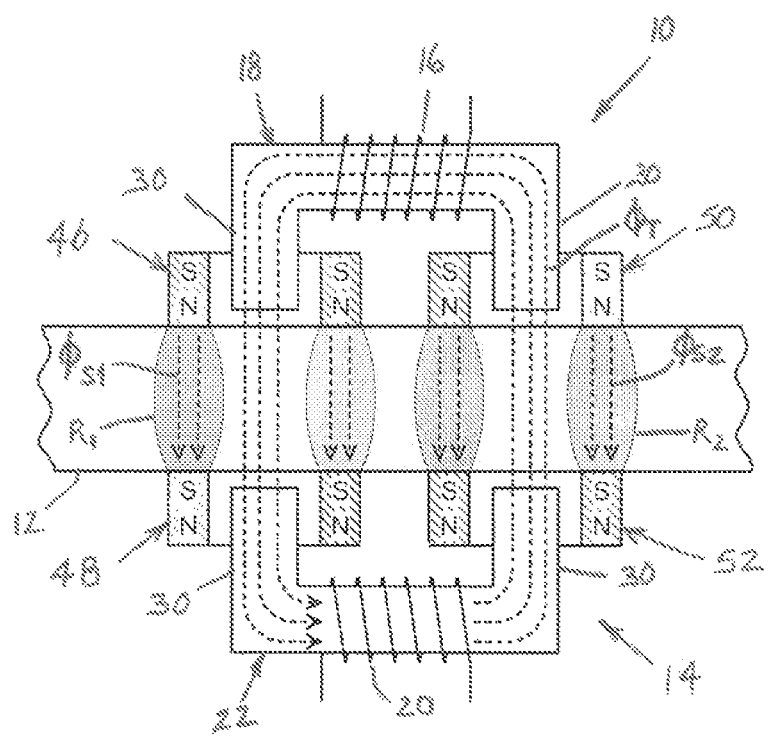
FIG. 15 is a cross sectional representation of the inductive power/data transfer system of FIG. 14 taken along line 15-15.

Referring now to FIGS. 14 and 15, a third embodiment of the magnetic saturation apparatus of the present invention is shown to comprise first and second generally ring-shaped or toroidal saturation magnets 46, 48 which in use are positioned generally concentrically on opposite sides of the barrier 12, and optional third and fourth generally circular or toroidal saturation magnets 50, 52 which in use are also positioned generally concentrically on opposite sides of the barrier. The magnets 48-52 may comprise permanent magnets which are positioned as shown in FIG. 15 with opposite poles facing each other. As an alternative, one or both of the first and third magnets 46, 50 may comprise an electromagnet. The transmitter core 18 is positioned such that each leg portion 30 is received in a corresponding one of the first and third magnets 46, 50, and the receiver core 22 is positioned such that each leg portion 30 is received in a corresponding one of the second and fourth magnets 48, 52. As with the embodiments discussed above, the magnets 46-52 may be mounted to or supported adjacent the barrier 12 by any suitable means.

Figure 16:
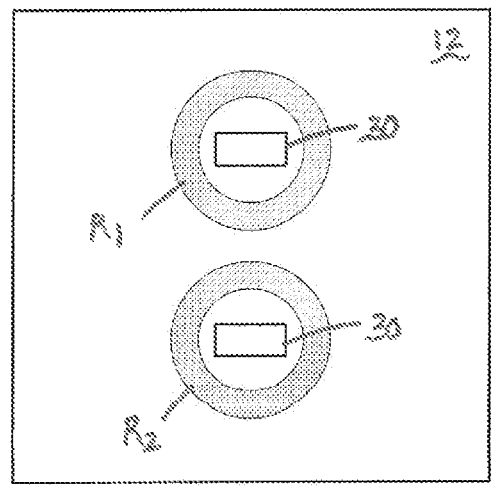
FIG. 16 is a highly idealized representation of the saturation region which is generated in the barrier by the saturation apparatus of FIG. 14.

In operation of the saturation apparatus of this embodiment of the invention, the first and second magnets 46, 48 generate a first saturation flux $\varphi_{S1}$ which as shown in FIGS. 15 and 16 flows transversely through the barrier 12 and effectively reduces the magnetic permeability of a generally circular first saturation region $R_1$ of the barrier located around a corresponding leg portion 30 of the transmitter core 18. As a result, the flux $\varphi_T$ generated by the transmitter 10 will be inhibited from flowing through the barrier 12 from one leg portion 30 of the transmitter core 18 to the other. In a similar manner, the optional third and fourth magnets 50, 52, if present, generate a second saturation flux $\varphi_{S2}$ which flows transversely through the barrier 12 and effectively reduces the magnetic permeability of a generally circular second saturation region $R_2$ of the barrier located around a corresponding leg portion 30 of the transmitter core 18. This second saturation region $R_2$ will assist the first saturation region $R_1$ in inhibiting the flux $\varphi_T$ generated by the transmitter 10 from shorting through the barrier 12 from one leg portion 30 of the transmitter core 18 to the other. Thus, the first and second saturation regions $R_1$, $R_2$ will guide the flux $\varphi_T$ through the barrier 12 and into the receiver core 22.

Figure 17:
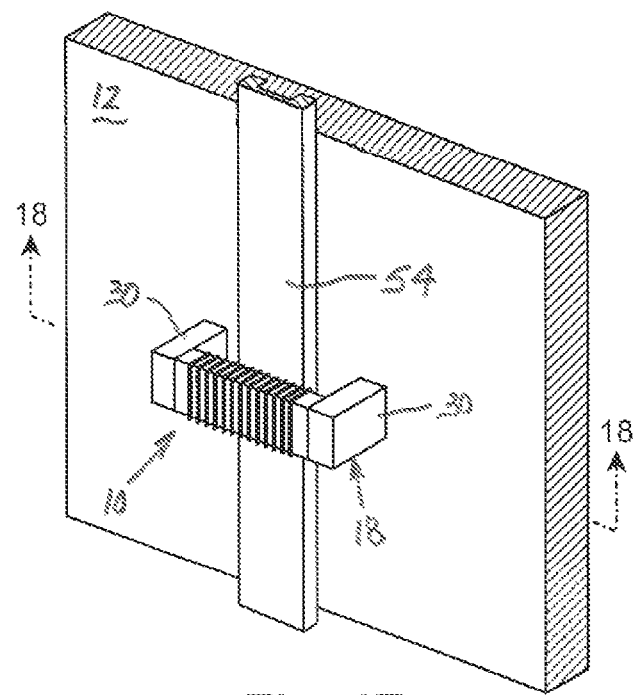
FIG. 17 is a perspective view of the inductive power/data transfer system of FIG. 1 including yet another embodiment of the magnetic saturation apparatus of the present invention.
Figure 18:
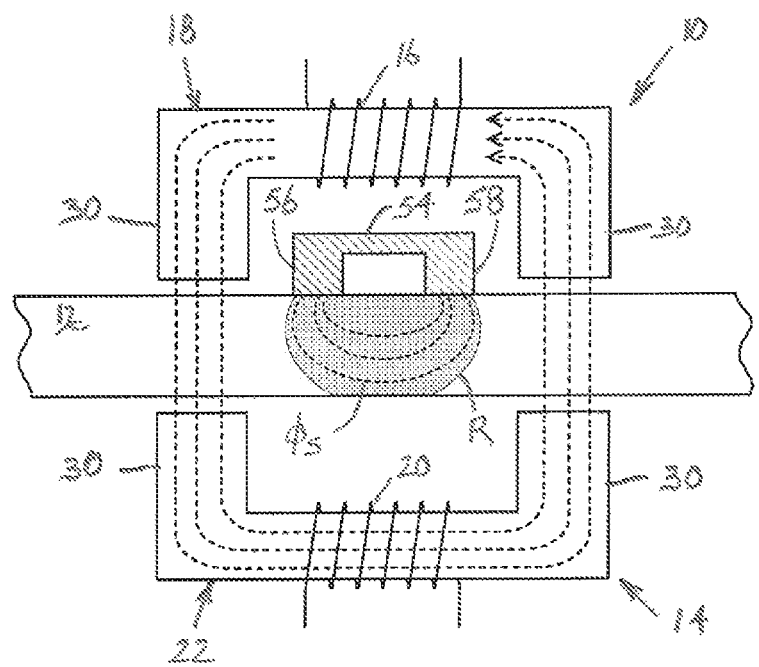
FIG. 18 is a cross sectional representation of the inductive power/data transfer system of FIG. 17 taken along line 18-18.

Another embodiment of the magnetic saturation apparatus of the present invention is shown in FIGS. 17 and 18. The saturation apparatus of this embodiment of the invention includes an elongated saturation magnet 54 which is positioned between the leg portions 30 of the transmitter core 18. The magnet 54 comprises two longitudinally extending poles 56 and 58 (hereafter referred to as saturation poles) and a length which is sufficient to prevent the magnetic flux generated by the transmitter 10 from shorting through the barrier 12 around the ends of the magnet. The magnet 54 may comprise a permanent magnet or an electromagnet. In addition, as with the embodiments discussed above, the magnet 54 may be mounted to or supported adjacent the barrier 12 by any suitable means.

In operation, the magnet 54 generates a saturation flux $\varphi_S$ which flows from the first saturation pole 56, through the barrier 12 and into the second saturation pole 58, or vice-versa. The saturation flux $\varphi_S$ effectively reduces the magnetic permeability of a generally rectangular saturation region R of the barrier 12 which is located between the leg portions 30 of the transmitter core 18. As a result, the flux $\varphi_T$ generated by the transmitter 10 will be inhibited from flowing through the barrier 12 from one leg portion 30 of the transmitter core 18 to the other and instead will be guided transversely through the barrier and into the receiver core 22.

Thus, the magnetic saturation apparatus of this embodiment of the invention does not require the placement of saturation magnets on both sides of the barrier 12. The magnet 54 may be positioned on the same side of the barrier 12 as the receiver 14 or, as shown in FIGS. 17 and 18, on the same side of the barrier as the transmitter 10. In addition, the magnet 54 may comprise a number of different configurations, as long as it is capable of generating a saturation flux which is sufficient to inhibit the flux generated by the transmitter 10 from shorting through the barrier 12 from one leg portion 30 of the transmitter core 18 to the other.

As mentioned above, the saturation magnets may be permanent magnets or a combination of permanent magnets and electro-magnets. If permanent magnets are employed, the transmitter 10 may be adapted to generate a single sided waveform which does not cross zero. In this manner, the transmission signal will not detract from the magnetic field generated by the saturation magnets during each half-cycle of the transmission.

Furthermore, it should be noted that since the transmitter and receiver cores 18, 22 are commonly made of a ferrite or magnetic steel, the proximity of the saturation magnets to the cores could cause partial saturation of the cores. To avoid this, a high permeability shielding material, such as mu-metal, may be used to help block the transmitter and receiver cores 18, 22 from the magnetic field generated by the saturation magnets.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. In a wireless inductive power and/or data transfer system comprising a magnetic field transmitter which is positioned on a first side of a barrier and a magnetic field receiver which is positioned on a second side of the barrier opposite the first side, the transmitter comprising two transmitter poles and the receiver comprising two receiver poles which are each positioned opposite a corresponding transmitter pole, the transmitter generating a magnetic flux which is intended to be coupled across the barrier and into the receiver, the improvement comprising a magnetic saturation apparatus which includes:
   at least a first saturation magnet which is positioned on one of the first and second sides of the barrier, the first saturation magnet comprising at least a first portion which is positioned between the two transmitter poles or the two receiver poles;
   wherein in use the first saturation magnet generates a saturation flux in an adjacent saturation region of the barrier, the saturation region being located at least partially between the two transmitter poles or the two receiver poles; and
   wherein the saturation flux effectively lowers the magnetic permeability of the saturation region and thereby inhibits the magnetic flux generated by the transmitter from shorting through the barrier between the transmitter poles;
   whereby the saturation region facilitates the flow of magnetic flux from the transmitter into the receiver.

2. The wireless inductive power and/or data transfer system of claim 1, wherein the first saturation magnet includes a second portion which is positioned around both of the transmitter poles or both of the receiver poles.

3. The wireless inductive power and/or data transfer system of claim 1, wherein the first saturation magnet is positioned around one of the two transmitter poles or one of the two receiver poles.

4. The wireless inductive power and/or data transfer system of claim 3, further comprising a second saturation magnet which is positioned around the other of the two transmitter poles or the other of the two receiver poles.

5. The wireless inductive power and/or data transfer system of claim 1, further comprising a second saturation magnet which is positioned on a side of the barrier opposite the first saturation magnet, wherein the saturation region is located between the first and second saturation magnets.

6. The wireless inductive power and/or data transfer system of claim 5, wherein
   the first saturation magnet includes at least a first portion which is positioned between the transmitter poles and
   the second saturation magnet includes at least a first portion which is positioned between the receiver poles.

7. The wireless inductive power and/or data transfer system of claim 6, wherein
   the first saturation magnet includes a second portion which is positioned around both of the transmitter poles and
   the second saturation magnet includes a second portion which is positioned around both of the receiver poles.

8. The wireless inductive power and/or data transfer system of claim 5, wherein
   the first saturation magnet is positioned around the first transmitter pole and
   the second saturation magnet is positioned around the receiver pole which is located opposite the first transmitter pole.

9. The wireless inductive power and/or data transfer system of claim 8, further comprising:
   a third saturation magnet which is positioned around the second transmitter pole; and
   a fourth saturation magnet which is positioned around the receiver pole located opposite the second transmitter pole.

10. The wireless inductive power and/or data transfer system of claim 1, wherein the first saturation magnet includes an elongated member which is positioned between the two transmitter poles or the two receiver poles.

11. The wireless inductive power and/or data transfer system of claim 10, wherein the barrier comprises a tubular member and the first saturation magnet is configured to conform to the shape of the tubular member.

12. The wireless inductive power and/or data transfer system of claim 11, wherein the first saturation magnet comprises a diameter which corresponds to a diameter of the tubular member.

13. The wireless inductive power and/or data transfer system of claim 10, wherein the first saturation magnet comprises first and second longitudinally extending saturation poles and the saturation flux flows from the first saturation pole, through the barrier and into the second saturation pole.

14. The wireless inductive power and/or data transfer system of claim 1, wherein the first saturation magnet includes:
   a generally circular first ring portion;
   a generally straight first rail portion which bisects the first ring portion; and
   two generally semi-circular first apertures which are defined by the first ring and first rail portions;
   wherein each transmitter pole is positioned in a corresponding first aperture.

15. The wireless inductive power and/or data transfer system of claim 14, wherein the saturation apparatus further comprises a second saturation magnet which is positioned on a side of the barrier opposite the first saturation magnet, the second saturation magnet including:
   a generally circular second ring portion;
   a generally straight second rail portion which bisects the second ring portion; and
   two generally semi-circular second apertures which are defined by the second ring and second rail portions;
   wherein each receiver pole is positioned in a corresponding first aperture.

16. The wireless inductive power and/or data transfer system of claim 1, wherein the first saturation magnet comprises a ring-shaped configuration and is positioned around the first transmitter pole.

17. The wireless inductive power and/or data transfer system of claim 16, wherein the saturation apparatus further comprises a ring-shaped second saturation magnet which is positioned around the receiver pole located opposite the first transmitter pole.

18. The wireless inductive power and/or data transfer system of claim 17, further comprising a ring-shaped third saturation magnet which is positioned around the second transmitter pole.

19. The wireless inductive power and/or data transfer system of claim 18, further comprising a ring-shaped fourth saturation magnet which is positioned around the receiver pole located opposite the second transmitter pole.

20. A method for facilitating the flow of magnetic flux from a magnetic field transmitter to a magnetic field receiver, the transmitter and receiver being located on opposite sides of a barrier, the transmitter comprising two transmitter poles and the receiver comprising two receiver poles which are each positioned opposite a corresponding transmitter pole, the method comprising:

reducing the magnetic permeability of a region of the barrier which is located at least partially between the two transmitter poles or the two receiver poles;

wherein the region of reduced magnetic permeability inhibits the magnetic flux generated by the transmitter from shorting through the barrier between the transmitter poles;

whereby the region of reduced magnetic permeability facilitates the flow of magnetic flux from the transmitter into the receiver.

21. The method of claim 20, wherein the region of reduced magnetic permeability comprises a second portion which is located around both of the two transmitter poles or both of the two receiver poles.

22. The method of claim 20, wherein the region of reduced magnetic permeability comprises a first portion which is located around one of the two transmitter poles or one of the two receiver poles.

23. The method of claim 22, wherein the region of reduced magnetic permeability comprises a second portion which is located around the other of the two transmitter poles or the other of the two receiver poles.

\* \* \* \* \*